(12) United States Patent
Cheng et al.

(10) Patent No.: US 7,344,801 B2
(45) Date of Patent: Mar. 18, 2008

(54) HIGH-VOLTAGE DUAL ELECTROLYTE ELECTROCHEMICAL POWER SOURCES

(76) Inventors: Shao-An Cheng, Room 321 Block 75, Qioshichum, Hangzhou, 310027 (CN); Kwong-Yu Chan, 15A Block 1 23 Sha Wan Drive, Hong Kong (HK)

( * ) Notice: Subject to any disclaimer, the term of this patent is extended or adjusted under 35 U.S.C. 154(b) by 549 days.

(21) Appl. No.: 10/444,036

(22) Filed: May 21, 2003

(65) Prior Publication Data
US 2004/0121227 A1 Jun. 24, 2004

Related U.S. Application Data

(60) Provisional application No. 60/383,377, filed on May 24, 2002.

(51) Int. Cl.
*H01M 8/08* (2006.01)
*H01M 10/26* (2006.01)
*H01M 14/00* (2006.01)
(52) U.S. Cl. .................. 429/101; 429/46; 429/204; 429/206; 429/304
(58) Field of Classification Search ............ None
See application file for complete search history.

(56) References Cited

U.S. PATENT DOCUMENTS 307,945 A * 11/1884 Hogg ...................... 429/101
4,037,031 A * 7/1977 Jacob ...................... 429/149
5,512,390 A * 4/1996 Obushenko ................ 429/204
6,183,900 B1 * 2/2001 Bronoel et al. ............. 429/72

FOREIGN PATENT DOCUMENTS

JP 04-101358 * 4/1992

OTHER PUBLICATIONS

Paragraph 0002, D. Linden, et al., Handbook of Batteries, McGraw-Hill, 2002, pp. 23.9-23.10; pp. 24.8-24.9, no month.
Paragraph 0002, J. Larmine, et al., "Fuel Cell Systems Explained", John Wiley Press, 2000, pp. 46-47, no month.
Paragraph 0047, A.J. Bard, et al., "Electrochemical Methods-Fundamentals and Applications", p. 46, no date.
Paragraph 0054, A.J.B. Kemperman, "Handbook on Biopolar Membrane Technology", Twente University Press, 2000, ISBN 9036515203, pp. 12-13 and 49-61, no month.

* cited by examiner

*Primary Examiner*—John S. Maples
(74) *Attorney, Agent, or Firm*—Dickstein, Shapiro, LLP.

(57) ABSTRACT

An electrochemical device such as a battery and a fuel cell having two electrolytes between the anode and the cathode. The electrochemical device is preferably arranged with an alkaline electrolyte in contact with the anode and an acidic electrolyte in contact with the cathode. The electrolytes are separated by a bipolar membrane that preferably also provides ionic conductivity between the two electrolytes and also generates a supply of protons and hydroxide anions. The electrochemical device achieves fifty percent higher operating voltage and power compared to fuel cells with a single electrolyte.

30 Claims, 8 Drawing Sheets

DISCHARGING

Negative Electrode (Anode)        Positive Electrode (Cathode)

Bipolar Membrane $2MH + 2OH^- \rightarrow 2M + 2H_2O + 2e^-$ $PbO_2 + 4H^+ + SO_4^{2-} + 2e^- \rightarrow PbSO_4 + 2H_2O$ OH⁻ ←    → H⁺
NaOH      H₂SO₄

H₂O      H₂O $2H_2O \rightarrow 2H^+ + 2OH^-$

HIGH-VOLTAGE DUAL ELECTROLYTE ELECTROCHEMICAL POWER SOURCES

FIELD OF THE INVENTION

This application claims the benefit of U.S. Provisional Application No. 60/383,377, filed May 24, 2002, which is incorporated by reference herein.

BACKGROUND OF THE INVENTION

An electrochemical power source has an anode, a cathode and an electrolyte. Typical examples of electrochemical power sources are batteries and fuel cells. Batteries and fuel cells can be broadly classified according to their choice of electrolyte. Metal hydride batteries are alkaline and lead acid batteries are acidic. Common examples of fuel cells are phosphoric acid fuel cells (PAFC), molten carbonate fuel cells (MCFC), alkaline fuel cells (AFC), proton exchange membrane fuel cells (PEMFC), and solid oxide fuel cells (SOFC). Each of these uses only a single electrolyte. For example, phosphoric acid fuel cells use a saturated phosphoric acid electrolyte supported in an inert porous matrix, and alkaline fuel cells use an alkaline medium as an electrolyte.

An important characteristic used for comparing the performance of different cells is the open circuit voltage (OCV), which is the voltage across the cell when no current is drawn. In addition to being related to the voltage-current characteristics of a cell, the OCV can be calculated from thermodynamics. In batteries using aqueous electrolytes such as the lead-acid battery, the OCV is less than 2.0V (D. Linden and T. B. Reddy, "*Handbook of Batteries*", McGraw-Hill, 2002). A hydrogen-oxygen fuel cell has a theoretical OCV of 1.229 V, regardless of whether the electrolyte is alkaline or acidic. In reality, most non-metal fuels in fuel cells of various electrolytes have an OCV of about 1 volt (J. Larminie and A. Dicks, "*Fuel Cell Systems Explained,* " John Wiley Press, 2000).

In general, an increased operating voltage for a single cell will result in additional power and energy, and thus will be very advantageous for the practical application of batteries and fuel cells. Higher voltages are only possible by arranging multiple cells into a stack system. By a novel choice and design of electrolytes and membrane, the present invention provides a >30% increase in voltage and power in some batteries and a 50% increase in voltage and power in fuel cells. Since fuel cells are classified by their electrolytes, this novel use of more than one electrolyte will lead to a new class of fuel cells.

SUMMARY OF THE INVENTION

The present invention is directed to electrochemical device such as batteries and fuel cells having two electrolytes between the anode and the cathode. The batteries and fuel cells of this invention can have 50% higher operating voltage and power compared to fuel cells with a single electrolyte. The electrochemical device according to the present invention is preferably arranged with an alkaline electrolyte in contact with the anode and an acidic electrolyte in contact with the cathode. The electrolytes are separated by a bipolar membrane that preferably also provides ionic conductivity between the two electrolytes and also generates a supply of protons and hydroxide anions.

A further understanding of the invention can be obtained from the detailed discussion of specific embodiments below. For purposes of clarity, this discussion refers to devices, methods, and concepts in terms of specific examples. However, the method of the present invention may operate with a wide variety of types of devices. It is therefore intended that the invention not be limited by the discussion of specific embodiments.

Additional objects, advantages, aspects and features of the present invention will become apparent from the description of preferred embodiments, set forth below, which should be taken in conjunction with the accompanying drawings, a brief description of which follows.

BRIEF DESCRIPTION OF THE DRAWINGS

FIG. 1 is a schematic of the operation of a rechargeable battery embodiment of the present invention, with dual electrolyte and a bipolar membrane having a metal hydride anode and a lead dioxide cathode, where

DETAILED DESCRIPTION OF THE INVENTION

Figure 1A:
FIG. 1A illustrates discharging of the battery and FIG. 1B illustrates charging of the battery.
Figure 1A:
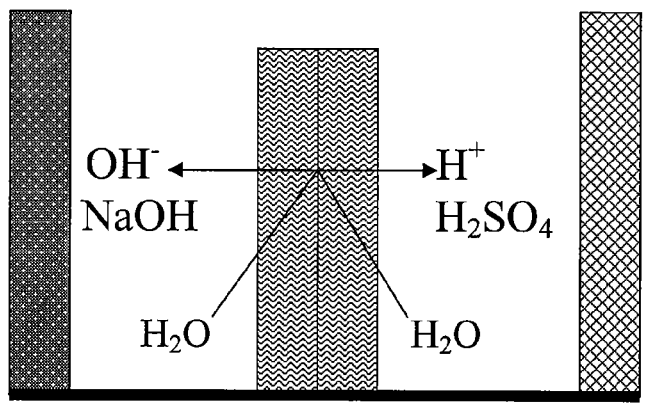
Figure 1A:

The present invention is directed to a novel electrochemical cell configuration that has many advantages over the prior art. In particular, by configuring a cell having an anode and cathode in different electrolytes, it has been found that a higher operating voltage is possible than with the use a single electrolyte. Although the methods and apparatus of the present invention have general applicability and can result in a cell design incorporating any one of a large number of anodes, cathodes and pairings of electrolytes, the principles of the present invention are most easily understood with reference to specific embodiments. Accordingly, the present invention will be described with references to embodiments that are meant to elucidate the various advantages and objects of the present invention without limiting the scope of this patent. In general, the present invention is applicable to batteries, such as the lead-acid metal-hydride hybrid battery, and fuel cells, such as hydrogen fuel cells and direct methanol fuel cells, as well as to sensors. As such, the present invention can be used to power a wide variety of devices including but not limited to toys, mobile phones, notebook computers, and electric vehicles. Thus, it will become obvious to one skilled in the art that the general principles described herein, demonstrated by specific embodiments, have wider applicability to batteries and fuel cells and to devices employing electrochemistry than contained within the specific embodiments.

The present invention preferably applies to an electrochemical cell with the anode operating in the alkaline electrolyte and the cathode operating in the acidic electrolyte. It can be applied to both batteries and fuel cells. It is difficult to find a battery system with the same electrochemical reactions either in acid or in alkaline. It is easier to illustrate the principles of this invention with the reactions of fuel cells which are feasible in alkaline as well as acid electrolytes. A major difference between batteries and fuel cells is that the former is a batch process whereas the latter can continuously operate indefinitely provided the fuel and oxidant are supplied continuously. The metal-air cells would be a hybrid of batteries and fuel cell since the metal fuel is supplied intermittently, the oxidant is supplied continuously, and the electrolyte needs to be regenerated. A special type of fuel cell is the regenerative fuel cell which operates periodically in two modes. In the regeneration mode, the fuel, e.g., hydrogen, is generated via the supply of electricity, e.g., the electrolysis of water. This is similar to a secondary, or rechargeable battery in which there is a charging and discharging mode. The present invention is more suitable to an intermittent operation with a recharging or regeneration mode to recreate the supply of protons in the acid electrolyte and hydroxide ions in the alkaline electrolyte.

In the anode of a fuel cell, the fuel including, but not limited to hydrogen, methanol or ethanol is oxidized electrochemically. The oxidation potential at the anode is at a lower value in an alkaline electrolyte than it would have been in a fuel cell in an acidic medium. This relationship of voltage with pH is generally known in the literature as the Nernst equation, described subsequently. By the same relationship, oxygen reduction at the cathode in an acid electrolyte will be at a higher potential than if had been in fuel cell in an alkaline electrolyte. The voltage of the full cell is the difference between the cathode potential and the anode potential. Thus, the highest value voltage across the full cell is attained if the anode is in alkaline condition and the cathode in acidic condition.

One key issue of sustaining this continuous dual electrolyte operation is the use of a bipolar membrane to maintain the alkalinity near the anode and acidity near the cathode of a fuel cell. The energy required to create these ions would be at least as high as the voltage gained through the Nernst equation as reasoned by reversible thermodynamics. But for short term usage, the bipolar membrane can split water into the ions with minimum energy to achieve the overall energy gain in the dual electrolyte fuel cell. When the acid and alkaline stored in the dual electrolytes are consumed, then higher voltages are needed to split water to maintain the dual electrolyte operation. This will be advantageous in the case of a rechargeable battery and regenerative fuel cells. The higher voltage required for charging is less of a concern, while the higher discharge output is desirable.

The general methodology of this dual electrolyte bipolar membrane battery will now be presented. For batteries using an aqueous electrolyte, the open-circuit voltage is limited by the electrochemical window of water, theoretically 1.23 V, beyond which electrolysis of water will occur. The highest OCV in an aqueous battery is 2.05 V in a lead-acid battery because the electrolyte is sulfuric acid and the electrolysis of water is kinetically hindered. The electrochemical reaction at the positive electrode of a lead-acid battery is $$PbO_2 + 4H^+ + 2e^- + SO_4^{2-} \rightleftharpoons PbSO_4 + 2H_2O \quad E°=1.685 \text{ V}, \tag{1}$$

where the forward reaction occurs during discharge, the backward reaction occurs during charging, and E° is the equilibrium half-cell potential at standard conditions. The corresponding reaction at the negative electrode is $$Pb + SO_4^{2-} \rightleftharpoons PbSO_4 + 2e^- \quad E°=-0.365 \text{ V}, \tag{2}$$

where the forward reaction occurs during discharge, the backward reaction occurs during charging, and E° is the equilibrium half-cell potential at standard conditions. Combining (1) and (2), the overall reaction of the lead acid battery is $$PbO_2 + Pb + 4H^+ + 2SO_4^{2-} \rightleftharpoons 2PbSO_4 + 2H_2O \quad V_{cell}=2.05 \text{ V}, \tag{3}$$

where the forward reaction occurs during discharge, the reverse occurs during charging, and the cell voltage $V_{cell}$ is the difference of the two electrode potentials in (1) and (2). The charging the operating voltage has to be higher than $V_{cell}$ whereas the discharge operating voltage will be lower than $V_{cell}$.

A typical battery that operates in an alkaline electrolyte is the nickel metal hydride battery. The electrochemical reaction at the positive electrode of a nickel metal hydride battery is $$NiOOH + H_2O + e^- \rightleftharpoons Ni(OH)_2 + OH^- \quad E°=0.52 \text{ V}, \tag{4}$$

where the forward reaction occurs during discharge, the backward reaction occurs during charging, and E° is the equilibrium half-cell potential at standard conditions. The corresponding reaction at the negative electrode is $$MH + OH^- \rightleftharpoons M + H_2O + e^- \quad E°=-0.83 \text{ V}, \tag{5}$$

where M is a hydrogen storage alloy of several choices, such as $(Mm_{1.0}Ni_{3.5}Co_{2.5}Al_{0.1})$ (Mm=mischmetal), $TiNi_2$, or $Zr(V_{0.33}Ni_{0.5}Mn_{0.17})_{2.4}$. The forward reaction occurs during discharge and the backward reaction occurs during charging. The E° is the equilibrium half-cell potential at standard conditions and has a similar value to the reduction of water to hydrogen gas in an alkaline electrolyte. Combining (1) and (2), the overall reaction of the nickel metal hydride battery is $$MH + NiOOH \rightleftharpoons M + Ni(OH)_2 \quad V_{cell}=1.35 \text{ V}, \tag{6}$$

where the forward reaction occurs during discharge, the reverse occurs during charging, and the cell voltage $V_{cell}$ is the difference of the two electrode potentials in (4) and (5).

Ideally, one would choose the lowest negative electrode potential and the highest positive potential, so that the cell voltage, which is the difference of the two potentials, is the highest. In general, batteries operating in an acid electrolyte will have a higher potential at the positive terminal, such as in equation (1); whereas batteries operating in an alkaline electrolyte will have a lower potential at the negative terminal, such as in equation (5). For a higher cell voltage, it will be ideal if we can choose a cell with an alkaline negative electrode and an acidic positive electrode. We can combine equations (1) and (5) to make a cell with the overall reaction $$PbO_2 + 2MH + H_2SO_4 + 2H^+ + 2OH^- \rightleftharpoons PbSO_4 + 2M + 2H_2O, \quad V_{cell}=2.515 \text{ V}. \tag{7}$$

Figure 1B:
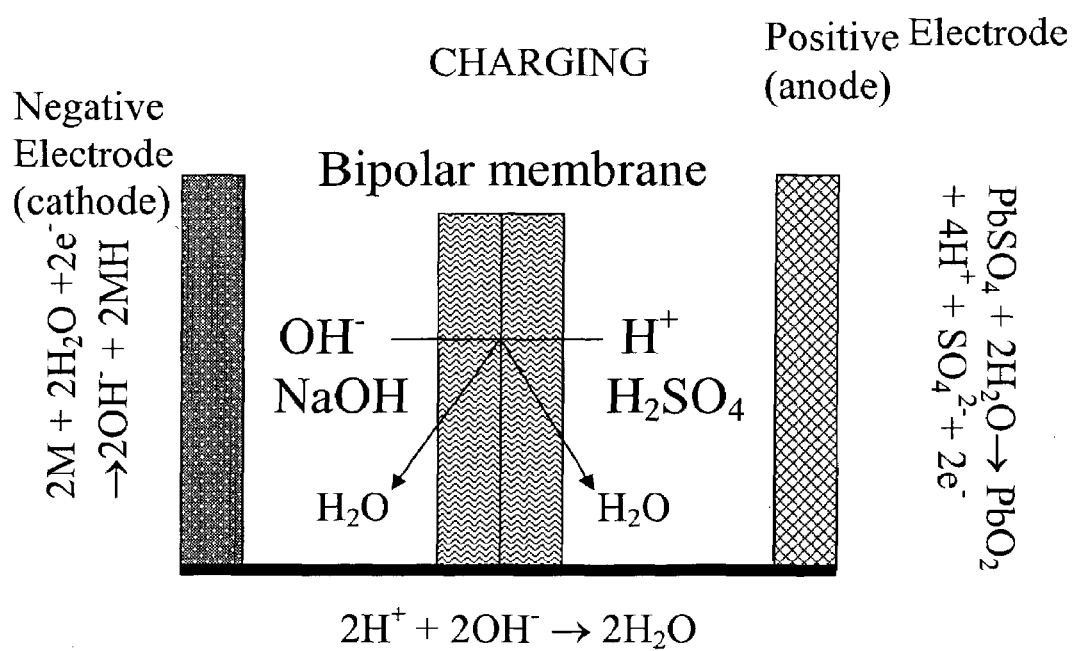

This is the combined lead-acid metal hydride hybrid battery with an alkaline electrolyte for the negative electrode and an acid electrode for the positive electrode. In addition to the reaction of the active materials, there is the neutralization reaction of combining protons and hydroxide ions to form water in equation (7). This neutralization reaction is giving the extra voltage and energy to the discharge. The water produced will be stored and used to regenerate the protons and hydroxide ions during charging the operation of the battery. A schematic of the setup of the hybrid battery of the present invention is shown in FIG. 1. Specifically, the battery of FIG. 1 includes a metal/metal-hydride electrode in an alkaline electrolyte and a lead-oxide/lead sulfate electrode in an acidic electrolyte. FIG. 1A illustrates discharging of the battery and FIG. 1B illustrates charging of the battery. A bipolar membrane is necessary to separate the electrolytes and allow the combined choices of anode and cathode that are not possible in a single electrolyte rechargeable battery. During discharge (FIG. 1A), water is consumed, metal hydride at the negative electrode (anode) becomes metal, and the lead oxide at the positive electrode (cathode) becomes lead sulfate. During charging (FIG. 1B), the reverse reactions occur and the negative electrode is the cathode and the positive electrode is the anode. The bipolar membrane allows ionic contact between the two electrolytes and can also regenerate the protons and hydroxide anions with the water splitting reaction during charging. An example of such a rechargeable battery using dual electrolyte is described in details later with results shown in FIG. 2. It is clearly shown in FIG. 2 that the $PbO_2$-MH dual electrolyte battery outperforms either the lead acid battery or the Ni-MH battery operating in a single electrolyte. During discharge, the average voltage is 2.45 V, the highest reported for any aqueous electrolyte rechargeable battery system. The operating voltage during discharge is higher than the corresponding single electrolyte lead-acid or Ni-MH battery.

The general methodology of this invention for a fuel cell will now be presented. Apart from high temperature solid oxide and molten carbonate fuel cells, common fuel cells use either the acidic or the alkaline medium as the electrolyte, with protons or hydroxide ions as the corresponding charge carriers. Using the common hydrogen-oxygen fuel cell as the example, the reaction can proceed either in acidic or alkaline medium as in the following discussion.

When an acid electrolyte is used in a hydrogen-oxygen fuel cell, the electrochemical reactions and the corresponding standard electrode potentials (RHE) at the cathode are:

$$\tfrac{1}{2}O_2 + 2H^+ + 2e^- \rightarrow H_2O \text{ and } E° = 1.229 \text{ V}, \tag{8}$$

and at the anode are:

$$H_2 \rightarrow 2H^+ + 2e^- \text{ and } E° = 0.0 \text{ V}. \tag{9}$$

The net reaction and the overall voltage of the full cell is the difference between (8) and (9) such that the overall reaction and voltage are:

$$H_2 + \tfrac{1}{2}O_2 \rightarrow H_2O \text{ and } V_{cell} = 1.229 \text{ V}. \tag{10}$$

When an alkaline electrolyte is used in a hydrogen-oxygen fuel cell, the electrochemical reactions and the corresponding standard electrode potentials (RHE) at the cathode are:

$$\tfrac{1}{2}O_2 + H_2O + 2e^- \rightarrow 2OH^- \text{ and } E° = 0.401 \text{ V}, \tag{11}$$

and at the anode are:

$$H_2 + 2OH^- \rightarrow 2H_2O + 2e^- \text{ and } E = -0.828 \text{ V}. \tag{12}$$

The corresponding net reaction and the overall voltage of the full cell will be the same as equation (10).

The standard electrode potentials are related to the thermodynamics of the electrochemical reactions according to the Nernst equation (A. J. Bard and L. R. Faulkner, "*Electrochemical Methods-Fundamentals and Applications*," John Wiley & Sons, 1980):

$$E = E° + \frac{RT}{nF}\ln\left(\frac{[Ox]}{[Re]}\right). \tag{13}$$

For electrochemical reactions that involve protons, the electrode potential becomes pH dependent with $$E = E° - 0.0591V \ pH. \tag{14}$$

Therefore the hydrogen oxidation potential shifts by over 800 mV from operating in the acid medium (equation (9)) to the alkaline medium (equation (12)) with a pH shift of 14. Since a lower anode potential will give a larger overall cell voltage, it would appear favorable to operate in the alkaline medium. However, the cathode potential in equation (8) is similarly shifted to the value in equation (11) and the overall voltage of the cell remains the same, whether in alkaline or acid conditions. There are some other differences between operating in acid or alkaline media due to other concerns of kinetics and mass-transfer matters. In general, the cell voltages and the electrode potentials behave according to equation (8) through (14). Ideally, one would choose the best of the two worlds, i.e., to have the anodic reaction of (12) and the cathode reaction of (8). The voltage of this acid-alkaline fuel cell will be 2.057 V with an overall reaction and voltage of:

$$H_2 + \tfrac{1}{2}O_2 + 2H^+ + 2OH^- \rightarrow 3H_2O \text{ and } V_{cell} = 2.057V. \tag{15}$$

Combining the equations for an acidic cathode and an alkaline anode results in a voltage of 2.057 V that is much greater the voltage of 1.229 V for a cell operating with both electrodes in either an acid electrolyte or an alkaline electrolyte (equation (10)). However, the generation of hydrogen ions, as required by the cathode, and of hydroxide ions, as required by the anode is not accounted for in the overall balance represented by equation (15). Any hydrogen or hydroxide ions present in the electrolyte will thus disappear over time and render the fuel cell inoperable with no ions to carrier charges. In contrast, for a fuel cell operating at a steady state with a pure acidic or pure alkaline single electrolyte, the loss of ions is balanced by an ion generating reaction in either the cathode or the anode, as shown in equations (8), (9), (11), and (12). It is difficult to continuously supply protons and hydroxide ions to maintain the overall reaction in equation (15). But in the case of a regenerative hydrogen oxygen fuel cells, the protons and hydroxide ions can be replenished by a water splitting process of the bipolar membrane.

The generation of ions required to operate a fuel cell from two electrolytes is advantageously achieved by placing a barrier between the anode and cathode that can split water to supply the ions required by the electrodes as represented by equations (8) and (12). In one embodiment of the present invention, the barrier is a bipolar membrane that splits water present in one or both of the electrolytes. The mechanism of the water dissociation through the bipolar membrane has been described by Kemperman (A. J. B. Kemperman, "*Handbook on Bipolar Membrane Technology*," Twente University Press, 2000, ISBN 9036515203). The bipolar membrane serves several additional purposes. Firstly, it provides the barrier to the mixing of the acid and alkaline electrolytes. Secondly, it provides ionic contact between the two electrolytes with minimum resistance.

Figure 3:
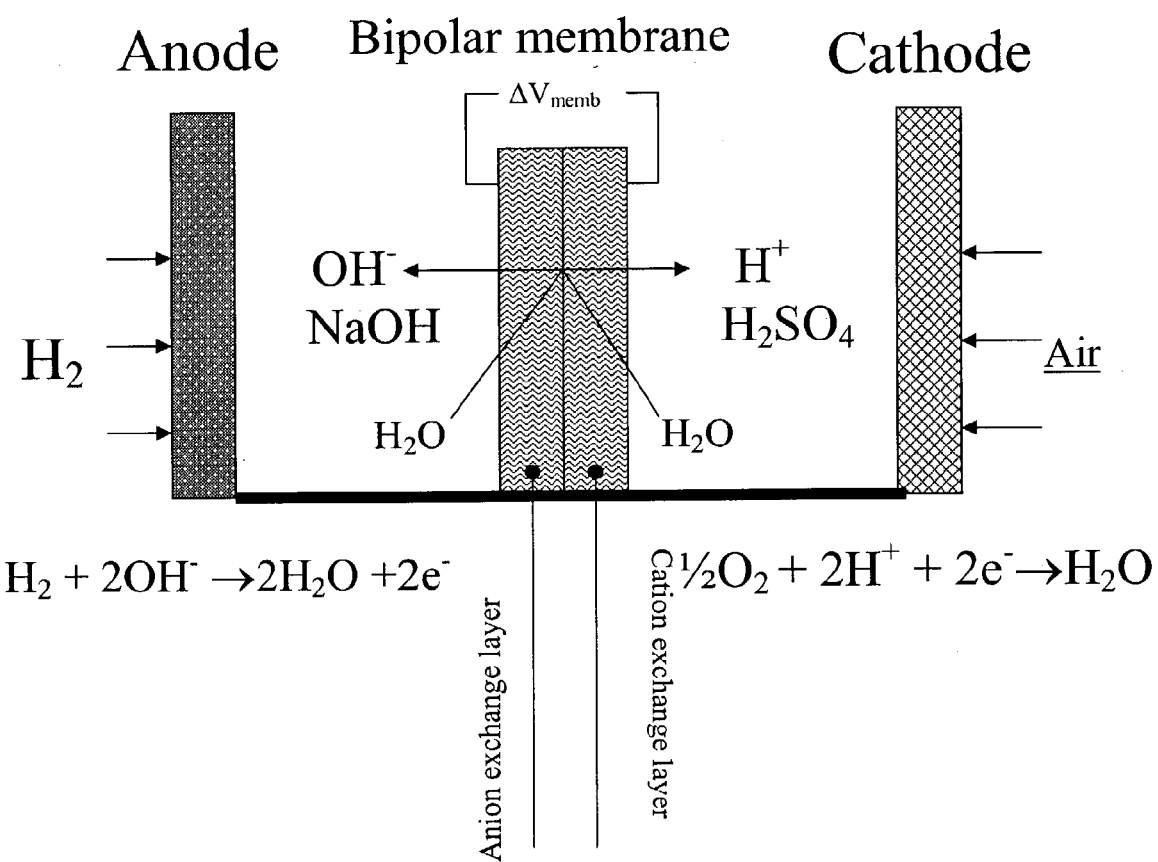
FIG. 3 is a schematic cross-sectional view of the dual electrolyte bipolar membrane fuel cell.

A schematic diagram of the setup of this invention with the bipolar membrane and two electrolytes system is shown in FIG. 3 for the hydrogen-air fuel cell. The anode is in contact with a NaOH electrolyte. Externally supplied hydrogen reacts with hydroxyl ions from the NaOH electrolyte at the anode, forming water and liberating electrons that are extracted through the anode. The cathode is in contact with a $H_2SO_4$ electrolyte. Externally supplied oxygen from air combines with hydrogen ions from the $H_2SO_4$ electrolyte and electrons from the cathode, forming water. A bipolar membrane separates the two electrolytes. According to the voltage $\Delta V_{memb}$ applied across anion and cation exchange members of the membrane, the bipolar membrane dissociates water from either electrolyte as follows:

$$H_2O \rightarrow H^+ + OH^-. \quad (16)$$

Subsequent to reaction (16), $OH^-$ migrates through the alkaline electrolyte to the anode, and $H^+$ through the acidic electrolyte to the cathode. The fuel cell of FIG. 3 is able to continuously consume hydrogen and oxygen to produce water and electric power.

The minimum voltage required for reaction (16) is described also by equation (14) depending on the pH difference between the two electrolytes. At steady-state, the actual operating membrane voltage will be larger than the value of equation (14). But for a short term usage, the acid and alkaline stored in the dual electrolyte, the bipolar membrane voltage is small. In general, the present invention results in increased voltage for a dual electrolyte cell whenever the increase in voltage in going from a single electrolyte to a dual electrolyte is greater than the voltage required by the bipolar membrane to split water.

Compared to an ordinary alkaline hydrogen-air fuel cell with similar electrodes but only a single alkaline electrolyte, the voltage gain can be more than 50% for most region of the polarization curve. This invention is not limited to the hydrogen-air fuel cell and is demonstrated also for the methanol-air fuel cell and ethanol-air fuel cell. Alternate embodiments include, but are not limited to fuels that are metals, hydrogen, carbon containing species and hydrogen containing species not limited to aluminum, zinc, hydrogen, methanol, ethanol, alcohols, methane, and sugars, and mixtures thereof. Fuel cells of the present invention can be arranged in stacks of multiple cells, either with other cells of the present invention or with cells of other types, for improved performance, such as increased output voltage.

Figure 6:
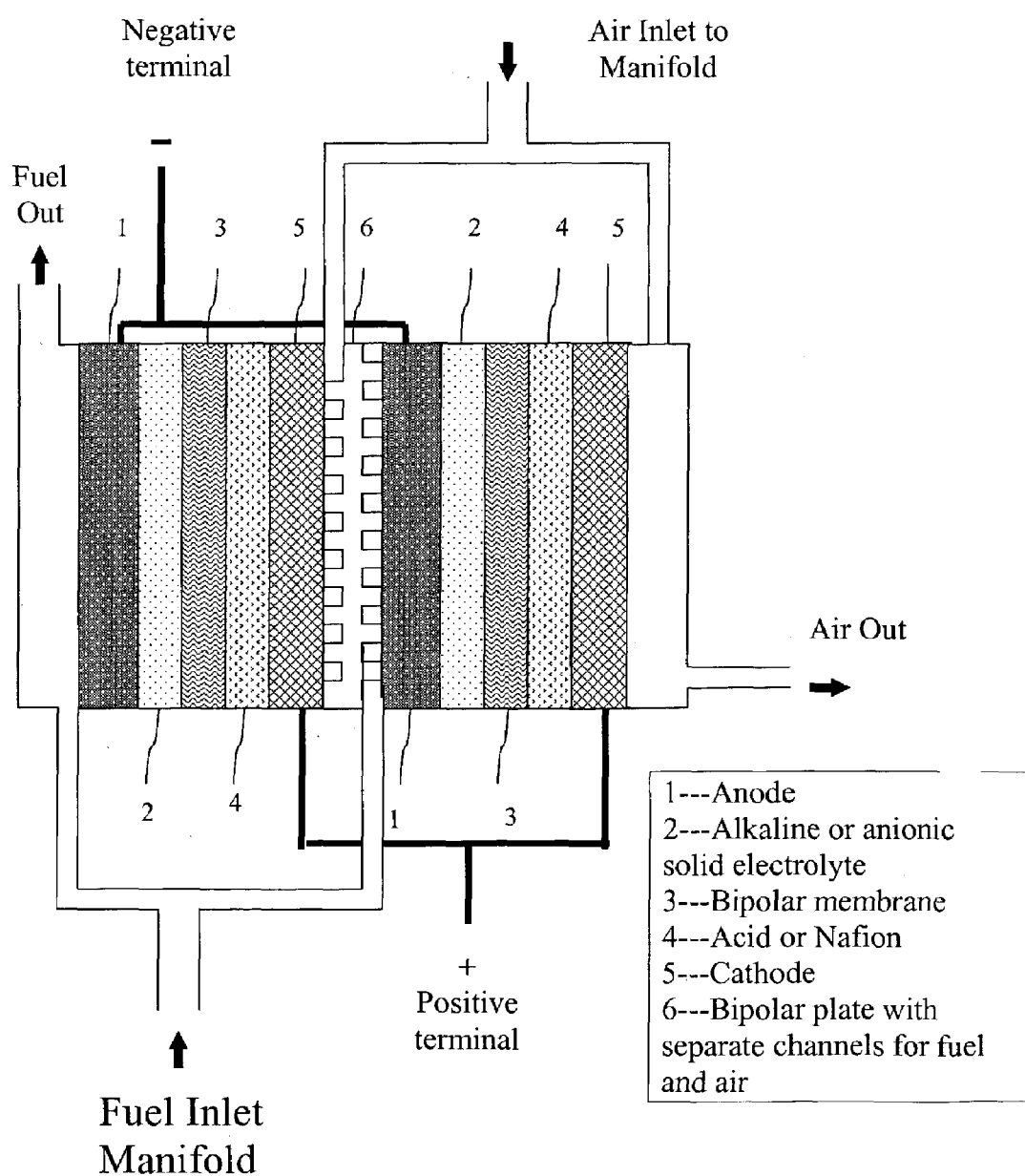
FIG. 6 is a schematic of a two fuel cell stack embodiment of the present invention, illustrating the connection of fuel and air inputs/outputs and electrical connections.
Figure 7:
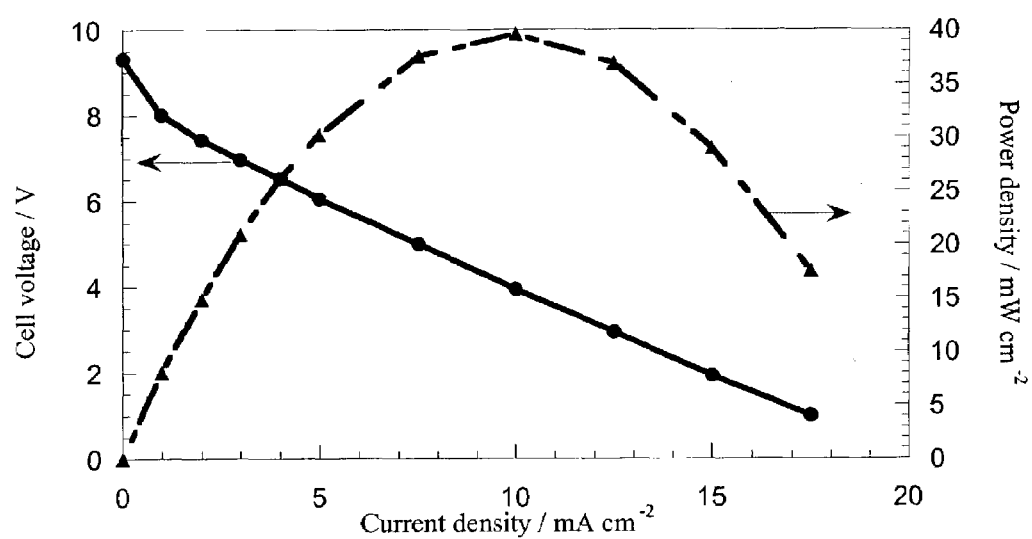
FIG. 7 is the voltage and power density curves for a 6-cell stack of ethanol-air fuel cells according to the present invention as a function of current density at room temperature and atmospheric pressure.

As one example of an alternative embodiment of the present invention, FIG. 6 is a schematic of a two fuel cell stack illustrating the connection of fuel and air inputs/outputs and electrical connections. Specifically, FIG. 6 show an embodiment of electrical connections and parallel feeds of fuel and air. Each fuel cell unit includes an anode (1), a first electrolyte (2), a bipolar membrane (3), a second electrolyte (4), and a cathode (5). A bipolar plate (6) having separate fuel and air channels is positioned between and separates the two stacks. An example of a stack of bipolar dual electrolyte cells is presented later and results are shown in FIG. 7.

In one embodiment of the present invention, an acidic electrolyte is used in contact with the cathode. The acidic electrolyte can be an aqueous solution of various concentrations such as, and not limited to, phosphoric acid, perchloric acid, and sulfuric acid, or their mixture with or without the support of an inert porous matrix. Alternatively, the acidic electrolyte can be an organic solution such as acetic acid, or carboxylic acid.

In another embodiment of the present invention, an alkaline electrolyte is used in contact with the anode. The alkaline electrolyte can be an aqueous solution of various concentrations such as and not limited to sodium hydroxide, ammonium hydroxide, lithium hydroxide and potassium hydroxide. Alternatively, the alkaline electrolyte can be an organic solution containing an alkaline such as alkyl amines.

For chemicals with high oxidization potentials, the electrochemical cell of this invention will allow them to be more detectable with an elevated and appreciable voltage. Hence, the invention is also suitable for sensor applications in detecting chemicals with a low concentration or with a high electrochemical oxidation potential such as acetate, high-carbon alcohol, etc. Sensors that fall within the scope of this invention operate in a manner similar to the inventive fuel cell, where the fuel is the species being detected. The output current, which is much improved using the dual electrolyte structure, is proportional to the amount of detected species.

To illustrate general features of the present invention, experiments were performed for a rechargeable battery and a fuel cell, as follows:

EXAMPLE 1

Figure 2:
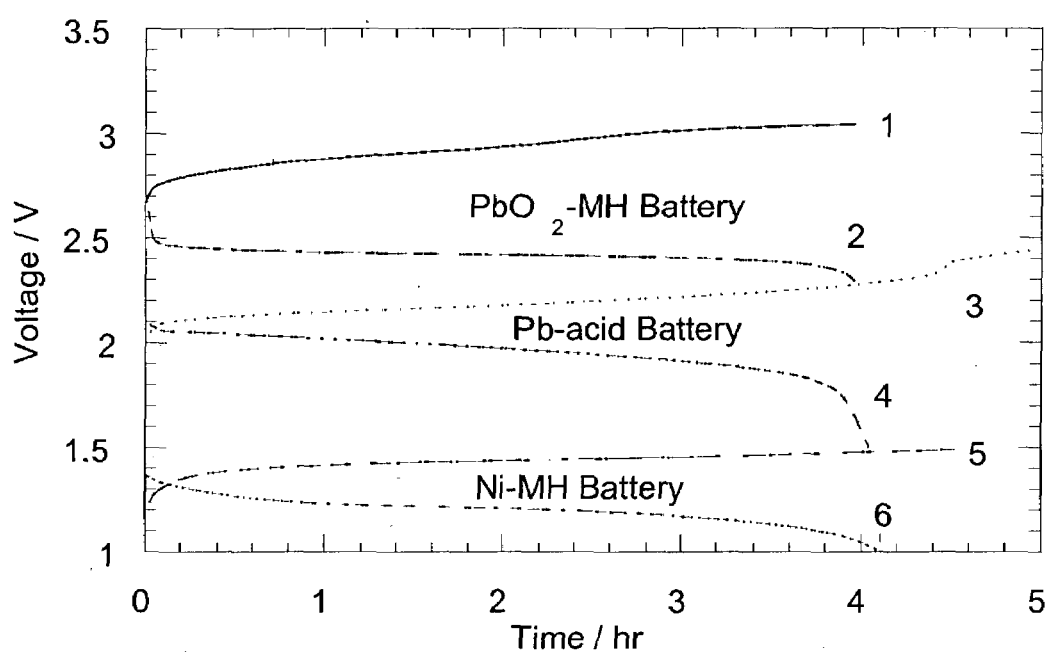
FIG. 2 is the charge-discharge curves of $PbO_2$—MH battery comparing with lead-acid battery and Ni—MH battery, wherein Curve 1—charge at ⅓ C for $PbO_2$—MH battery; curve 2—discharge at ⅓ C for $PbO_2$—MH battery; curve 3—charge at ⅓ C for lead-acid battery; curve 4—discharge at ⅓ C for lead-acid battery; curve 5—charge at ⅓ C for Ni—MH battery; and curve 6—discharge at ⅓ C for Ni—MH battery.

As the example of rechargeable battery of the present invention, a battery is constructed with dual electrolyte and bipolar membrane having a metal hydride (MH) anode and a lead dioxide ($PbO_2$) cathode. A MH negative electrode with 420 mAh is from a GP 14M145-U1 battery and $PbO_2$ positive electrode with 650 mAh is from a DiaMec DM6-1.3 lead-acid battery. A bipolar membrane MB-3 is from Membrane Technology Centre, Russia. The anode chamber is a 7 M NaOH solution and the cathode chamber is a 5 M $H_2SO_4$ solution. FIG. 2 shows the charge/discharge curves of this dual electrolyte battery. Results of individual single electrolyte lead-acid battery and Ni—MH battery are also in FIG. 2 for comparison. An OCV of 2.8 V and discharge voltage of 2.45 V at ⅓ C (20 mA $cm^{-2}$) can be obtained for $PbO_2$—MH dual electrolyte battery. The OCV for lead-acid battery in acid and Ni—MH battery in alkaline are 2.1V and 1.4 V, respectively. The discharge voltages at 20 mA $cm^{-3}$ are 1.9 V and 1.25 V for the lead-acid battery in acid and Ni—MH battery in alkaline, respectively.

EXAMPLE 2

A first example of a dual electrolyte fuel cell is now discussed. The anode chosen for this example was a model HREF electrode (Gaskatel GmbH, Germany). The electrode had a silver plated nickel screen as the current collector and Pt/C as the catalyst. The cathode was made by applying a paste of a mixture of Pt—$MoO_3$ and high surface area carbon onto carbon cloth (E-TEK, USA). The loading of Pt on the cathode was 1 mg/$cm^2$. The cathode can operate either in an acidic or alkaline medium. A bipolar membrane supplied by Electrosynthesis Co. was used. The anode chamber contained a 30 ml 3.5 M NaOH solution. The cathode chamber contained a 30 ml 2.5 M $H_2SO_4$. The cathode had a sprayed microporous PTFE non-wetting backing which side was exposed to ambient air during operation. The active area of both electrodes and membrane was 20 $cm^2$. The fuel cell operated at the room temperature and atmosphere pressure using hydrogen as the fuel entering into the anode side.

Figure 4:
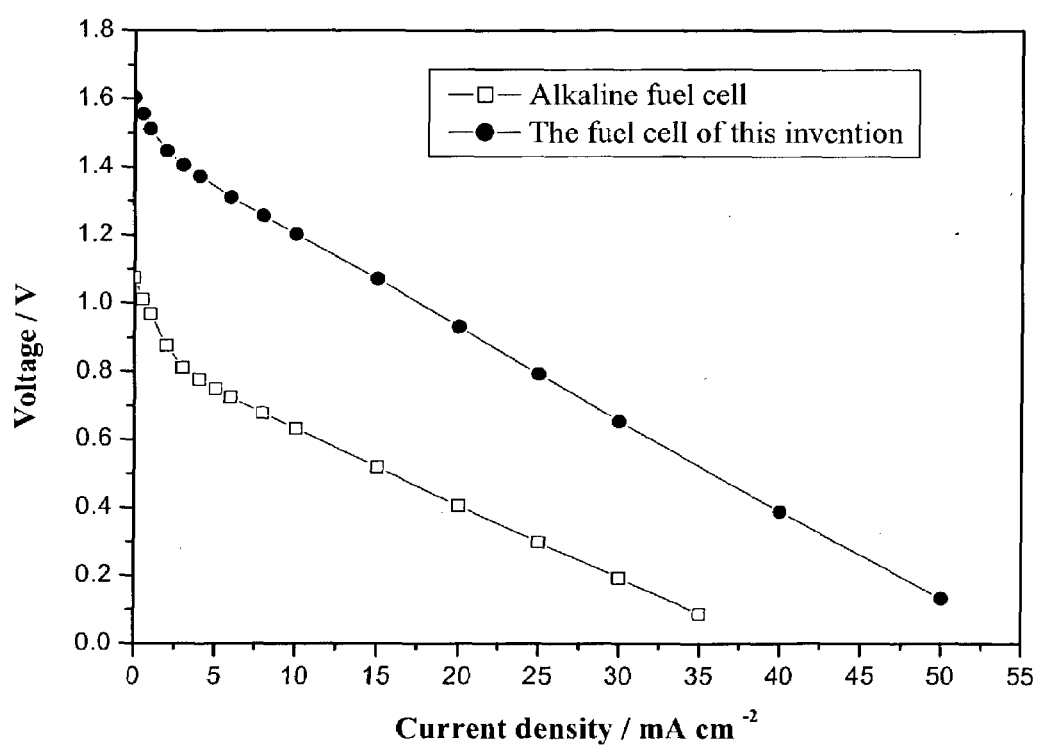
FIG. 4 shows the fuel cell voltage of a hydrogen-air fuel cell as a function of current density at room temperature and atmosphere pressure.

The initial polarization curves of this dual electrolyte bipolar membrane hydrogen-air fuel cell are shown in FIG. 4. It can be seen that an open circuit voltage of over 1.6 V is obtained. This voltage level has never been reported for a single pair of cathode and anode for the hydrogen-air fuel cell. In FIG. 4, comparison was made with a fuel cell using exactly the same configuration, the same anode, the same cathode, but without the bipolar membrane and the acid electrolyte. When a proton exchange polymer electrode membrane was used for the cathode side, an open circuit voltage of 1.9 V was observed for the single fuel cell. At a current density of 15 mA/cm$^2$, the voltage is 1.0 V, still above the open circuit voltage of the single electrolyte hydrogen-air fuel cell. For the whole polarization curve of the single electrolyte alkaline fuel cell, the dual electrolyte fuel cell has a voltage 50% higher and therefore, giving at least 50% more power than a single electrolyte fuel cell.

EXAMPLE 3

Figure 5:
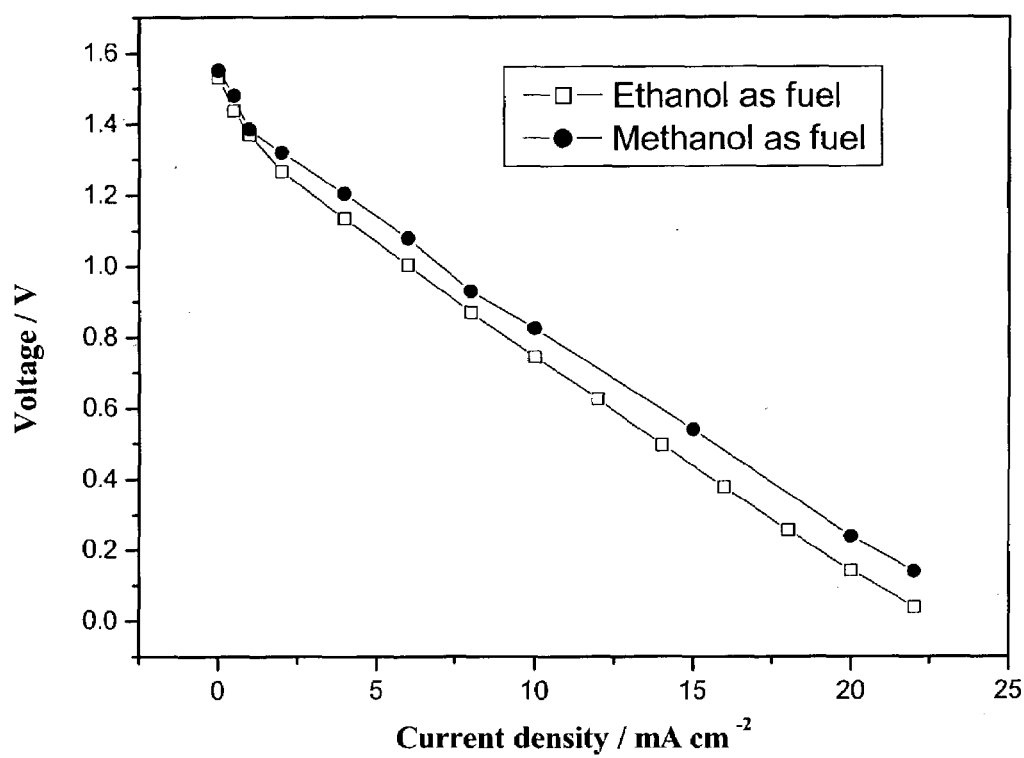
FIG. 5 shows the polarization curve of a methanol-air and ethanol-air fuel cell at room temperature and atmosphere pressure.

A second example of a dual electrolyte fuel cell is now discussed. The anode was prepared by applying a paste of a mixture of Pt—$V_2O_5$, Vulcan-72 carbon into a nickel foam. The loading of Pt was 0.4 mg/cm$^2$. The cathode and membrane was the same as in example 1. The active area of both electrodes and membrane was 26 cm$^2$. The anode chamber contained 50 ml 3.5 M NaOH and 1 M methanol or 1 M ethanol solution. The cathode chamber contained 50 ml 2.5 M $H_2SO_4$. The fuel cell ran at room temperature and atmosphere pressure. The polarization curves of the methanol-air fuel cell and the ethanol-air fuel cell are shown in FIG. 5. Again, voltage and power elevation can be seen with the dual electrolyte bipolar membrane operation.

EXAMPLE 4

A 6-cell stack of a dual electrolyte fuel cell using ethanol fuel is now discussed. The method for preparation of the electrodes was same as in example 1. The cathode catalyst was Pt/C from Gaskatel GmbH (Germany). The loading of Pt on the cathode was 1 mg/cm$^{-2}$. The anode catalyst was Pt—Ru/C from TANAKA KIKINZOKU KOGYO K.K. (Japan). The loading of metal on the anode was 2 mg/cm$^{-2}$. A bipolar membrane MB-3 supplied by Membrane Technology Centre (Russia) was used. Each anode chamber contained 4 ml 7 M NaOH and 0.5 M ethanol. Each cathode chamber contained 4 ml 5 M $H_2SO_4$. The active area of electrodes was 25 cm$^2$. The stack operated at the room temperature using atmosphere pressure air. FIG. 7 shows the polarization curve of the stack cell. It can be seen that an open circuit voltage of over 9.3 V is obtained. This voltage is almost equivalent to that of a 10-cell stack normal fuel cell. At a current density of 10 mA cm$^2$, the voltage of stack cell is 4 V which is higher than that of normal DMFC stack cell operating at 60-80° C. using a compressed air. The power density can be around 40 mW cm$^{-2}$ at a current density of 10 mA cm$^2$.

What is claimed is:

1. An electrochemical power source device comprising one or more electrochemical cells, each electrochemical cell comprising:
    an anode;
    a cathode;
    a bipolar membrane; and
    two different electrolytes,
    wherein each of said two electrolytes is in contact with a respective one of said two electrodes,
    wherein one of said two electrolytes is an organic acidic solution in contact with said cathode, and
    wherein said two electrolytes are separated by said bipolar membrane.

2. The electrochemical power source device of claim 1, wherein said bipolar membrane maintains ionic balance of the two electrolytes.

3. The electrochemical power source device of claim 1, wherein said acidic electrolyte is a solution of one or more acids in water.

4. The electrochemical power source device of claim 1, further including, an inert porous matrix.

5. The electrochemical power source device of claim 1, wherein said organic solution is selected from the group consisting of acetic acid and carboxylic acid, and mixtures thereof.

6. The electrochemical power source device of claim 1, wherein the operating cell voltage of said electrochemical device is greater than the operating cell voltage for a electrochemical device having one electrolyte.

7. A stack composed of two or more electrochemical power source devices as in claim 1 arranged in series.

8. The electrochemical power source device of claim 1, wherein, said electrochemical power source device is at least one battery.

9. An electrochemical power source device comprising:
    an anode;
    a cathode;
    a bipolar membrane; and
    two different electrolytes,
    wherein each of said two electrolytes is in contact with a respective one of said two electrodes;
    wherein said two electrolytes are separated by said bipolar membrane,
    wherein one of said two electrolytes is an alkaline electrolyte in contact with said anode, said alkaline electrolyte being an organic solution.

10. The electrochemical power source device of claim 9, wherein said alkaline electrolyte is selected from the group consisting of an aqueous solution of sodium hydroxide, ammonium hydroxide, lithium hydroxide, and potassium hydroxide, and mixtures thereof.

11. The electrochemical power source device of claim 9, wherein said organic solution contains alkyl amines.

12. The electrochemical power source device of claim 9, wherein said alkaline electrolyte is a solid polymer electrolyte capable of hydroxide anion exchange.

13. A stack composed of two or more electrochemical power source devices as in claim 10 arranged in series.

14. The electrochemical power source device of claim 9, wherein said electrochemical power source device is at least one battery.

15. The stack of claim 7, wherein at least one of said electrochemical power source devices is a battery.

16. The stack of claim 13, wherein at least one of said electrochemical power source devices is a battery.

17. The electrochemical power source device of claim 9, wherein the other of said two electrolytes is an acidic electrolyte in contact with said cathode.

18. The electrochemical power source device of claim 17, wherein said acidic electrolyte is a solution of one or more acids in water.

19. The electrochemical power source device of claim 18, wherein said acid is selected from the group consisting of phosphoric acid, perchloric acid, and sulfuric acid, and mixtures thereof.

20. The electrochemical power source device of claim 17, wherein said acidic electrolyte is an organic solution.

21. The electrochemical power source device of claim 20, wherein said organic solution is selected from the group consisting of acetic acid and carboxylic acid, and mixtures thereof.

22. The electrochemical power source device of claim 9, further including an inert porous matrix.

23. The electrochemical power source devise of claim 9, wherein the operating cell voltage of said electrochemical device is greater than the operating cell voltage for a electrochemical device having one electrolyte.

24. The electrochemical power source device of claim 9, wherein said bipolar membrane maintains ionic balance of the two electrolytes.

25. An electrochemical power source device comprising:
   an anode;
   a cathode;
   a bipolar membrane; and
   two different electrolytes,
   wherein each of said two electrolytes is in contact with a respective one of said two electrodes,
   wherein said two electrolytes are separated by said bipolar membrane, and
   wherein one of said two electrolytes is an alkaline electrolyte in contact with said anode, said alkaline electrolyte being a solid polymer electrolyte capable of hydroxide anion exchange.

26. The electrochemical power source device of claim 25, wherein the other of said two electrolytes is an organic acidic electrolyte in contact with said cathode.

27. The electrochemical power source device of claim 25, wherein the other of said two electrolytes is an acidic electrolyte selected from the group consisting of phosphoric acid, perchloric acid, and sulfuric acid, and mixtures thereof.

28. The electrochemical power source device of claim 25, wherein said electrochemical power source device is at least one battery.

29. A stack composed of two or more electrochemical power source devices as in claim 25 arranged in series.

30. The stack of claim 29, wherein at least one of said electrochemical power source devices is a battery.

* * * * *